United States Patent [19]

Fales

[11] Patent Number: 4,627,282

[45] Date of Patent: Dec. 9, 1986

[54] FLUID LEVEL SENSOR

[75] Inventor: Douglas I. Fales, Burton, Mich.

[73] Assignee: General Motors Corporation, Detroit, Mich.

[21] Appl. No.: 809,228

[22] Filed: Dec. 16, 1985

[51] Int. Cl.$^4$ .............................................. G01F 23/16
[52] U.S. Cl. ...................................... 73/302; 73/714
[58] Field of Search ........................... 73/299, 302, 714

[56] References Cited

U.S. PATENT DOCUMENTS

| 3,922,915 | 12/1975 | Andrews | 73/302 |
| 4,343,184 | 8/1982 | Jaumes | 73/299 |
| 4,373,388 | 2/1983 | Kitamura et al. | 73/301 |
| 4,489,595 | 12/1984 | Klomp et al. | 73/714 X |

Primary Examiner—Daniel M. Yasich
Attorney, Agent, or Firm—Howard N. Conkey

[57] ABSTRACT

A fluid level sensor responsive to the fluid pressure at the bottom of a tank for indicating fluid level including a fluid pressure amplifier that provides an amplified fluid pressure to a gage which is calibrated to provide a measure of fluid level.

2 Claims, 2 Drawing Figures

U.S. Patent  Dec. 9, 1986  4,627,282

FLUID LEVEL SENSOR

This invention relates to an apparatus for providing a measure of the level of fluid in a container.

The fluid pressure at the bottom of a container is directly related to the height of fluid in the container and the density of the fluid. If the density of the fluid is known, the level of fluid in the container can then be determined from the fluid pressure at the bottom of the container. It has been proposed to provide for a fluid level sensor in which the fluid pressure at the bottom of the container is monitored as an indication of fluid level. However, the variation in pressure in response to changes in fluid level are very small thereby requiring a highly senstive pressure gage to detect changes in fluid pressure so as to provide a measure of fluid level. A pressure gage having the required sensitivity would be very costly and would typically prohibit this form of fluid level sensing in many applications.

In accord with the present invention, a fluid level sensing system is provided that measures the fluid level in a container based on the fluid pressure at the bottom of the container. By the use of a pressure amplifier including a high pressure source such as the pump for pumping fluid from the container, pressure changes over a wide range as the fluid level varies thereby allowing the use of a pressure gage having less sensitivity.

Figure 1:
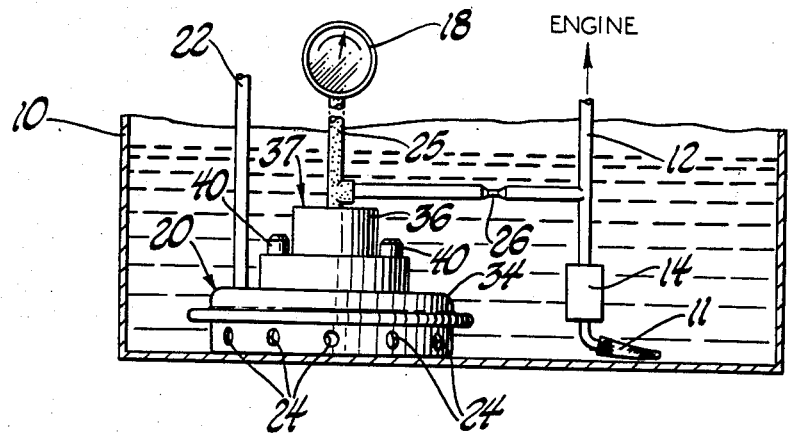
Figure 2:
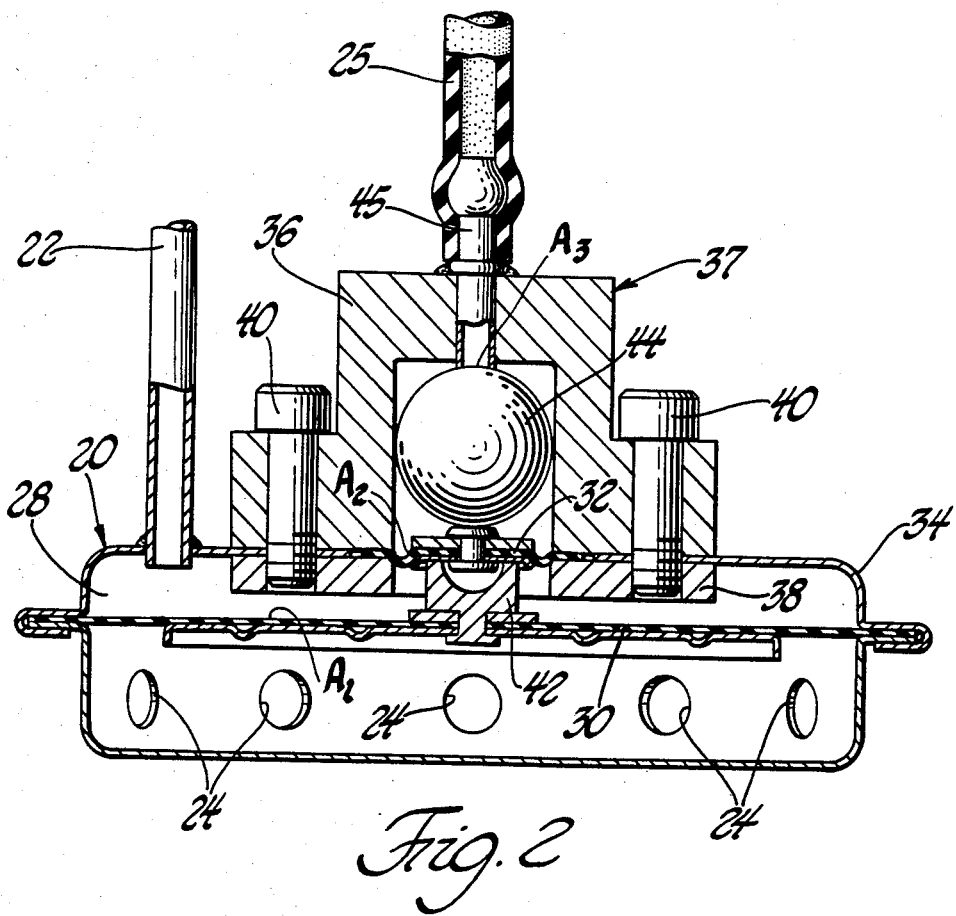

The invention may be best understood by reference to the following description of a preferred embodiment and the drawings in which:

FIG. 1 is a diagram illustrating the fluid level sensing system incorporating the principles of this invention; and FIG. 2 is a diagram illustrating the pressure amplifier of FIG. 1.

Referring to FIG. 1, the invention is illustrated with respect to a vented vehicle fuel tank 10 from which fuel is delivered to a vehicle engine through an intake, including a filter element 11, at the bottom of the tank and a fuel line 12 by means of an electric fuel pump 14. The electric fuel pump 14 is of the known type positioned in the tank 10 and which is energized via electric leads (not illustrated) to deliver fuel under pressure to the vehicle engine.

A fuel gage to monitor the level of fuel in the fuel tank 10 takes the form of a pressure transducer 18 to which fuel at a pressure related to the level of the fuel in the tank 10 is applied. A pressure amplifier 20 is positioned at the bottom of the fuel tank 10 so as to be exposed to the fluid pressure that is related to the level of fuel in the tank 10. The pressure amplifier 20 is vented to the atmosphere via a conduit 22. Fuel at the pressure related to its level in the tank 10 is admitted to the amplifier 20 via openings 24 therein.

The output of the amplifier 20 is an amplified fuel pressure that is coupled to the pressure sensor 18 through an output conduit 25. The operating pressure for the amplifier 20 is provided by the fuel pump 14. This is accomplished by coupling the pressurized fuel output of the fuel pump 14 to the output conduit 25 via a restriction in the form of an orifice 26. As will be described with respect to FIG. 2, the pressure in the output conduit 25 and which is sensed by the pressure gage 18 is modulated by the amplifier 20 to a value equal to $K*P_f$ where K is the gain of the amplifier 20 and $P_f$ is the fuel pressure dependent upon the level of fuel in the fuel tank 10.

Referring to FIG. 2, the pressure amplifier 20 includes an air chamber 28 formed by opposed diaphragms 30 and 32 and a casing 34. The diaphragm 32 is captured by crimping the casing 34 which seals the air chamber from the fuel entering the casing via the openings 24. The diaphragm 32 and casing 34 are captured by the housing 36 of a ball valve 37 and opposing member 38 such as by threaded bolts 40 to seal the air chamber 28 from fuel entering the interior of the valve housing 36 through openings provided therein (not shown). A spacer 42 is carried by the diaphragm 30 and engages the diaphragm 32. The air chamber 28 is vented to atmospheric pressure via the conduit 22 previously described.

The ball valve 37 includes a ball 44 within the housing 36 that cooperates with the valve seat formed by the end of a tubular fitting 45 extending through the top of the housing 36 to form the ball valve. The output conduit 25 is pushed over the external end of the fitting 45 to establish fluid communication with the ball valve 37. The ball 44 is engaged by the diaphragm 32 at a point diametrically opposite the valve seat formed by the end of the fitting 45 for movement therewith, movement of the diaphram 32 upward tending to close the ball valve 37 and movement downward opening the ball valve 37.

Fuel at a pressure dependent upon its level in the tank 10 applies a pressure on the bottom side of the diaphragm 30 tending to displace the diaphragm 30 in an upward direction against the spacer 42. Fuel at the same pressure is applied to the upper side of the diaphragm 32 through openings (not shown) tending to displace the diagragm in a downward direction against the spacer 42. The area $A_1$ of the diaphragm 30 is greater than the area $A_2$ of the diaphragm 32 resulting in a net force tending to displace both of the diaphragms 30 and 32 and the ball 44 engaged by the diaphragm 32 in an upward direction to close the ball valve 37. An opposing force acting on the ball 44 tending to displace the ball 44 downward to open the ball valve is created by the pressure in the output conduit 25 acting on the ball 44 over the area $A_3$ of the terminal end of the fitting 45.

The net effect of the forces acting on the ball 44 is to regulate the pressure in the output conduit 25 to a pressure that is equal to the pressure of the fuel at the bottom of the fuel tank 10 times the gain K of the amplifier 20. The gain K can be determined by summing the forces acting on the ball 44 of the ball valve 37.

The forces acting on the ball 44 is defined by the following equation:

$$P_g*A_3 = P_f*A_1 - P_f*A_2 + P_f*A_3 - W \qquad (1)$$

where $P_g$ is the pressure per unit area in the output conduit sensed by the pressure gage 18, $P_f$ is the fuel pressure per unit area at the bottom of the fuel tank 10, $A_1$ is the area of the diaphragm 30, $A_2$ is the area of the diaphragm 32, $A_3$ is the area of the end of the fitting 45 and W is the weight of the ball 44. If the specific gravity of the ball 44 is substantially equal to the fuel and if the area $A_3$ is substantially less than the area $A_1$, the following equation for the pressure sensed by the pressure gage 18 results:

$$P_g = P_f(A_1 - A_2)/A_3. \qquad (2)$$

Any errors that may result from the foregoing assumptions relating to the ball weight and area $A_3$ can be compensated for via calibration of the pressure gage 18.

As can be seen from equation (2) the gain K of the amplifier is equal to $(A_1-A_2)/A_3$. By making $A_2$ smaller than $A_1$ and by making $A_3$ smaller than the difference between $A_1$ and $A_2$, the gain K of the amplifier 20 can be made much greater than unity so that the pressure in the conduit 25 at the output of the pressure amplifier 20 is much greater than the fuel pressure at the bottom of the fuel tank 10. By amplifying the fuel pressure in the foregoing manner, a wide range of pressures is provided to the pressure gage in response to the limited range of fuel pressures as the fuel quantity in the tank 10 varies from full to empty. This expanded range allows the use of a pressure gage 18 that is not highly sensitive to small pressure changes and therefore more economical while yet providing an accurate indication of fuel remaining in the fuel tank 10.

The foregoing description of a preferred embodiment for the purpose of illustrating the invention is not to be considered to be as limiting or restricting the invention since many modifications may be made by the exercise of skill in the art without departing from the scope of the invention.

The embodiments of the invention in which an exclusive property or privilege is claimed are defined as follows:

1. An apparatus for indicating the level of fluid in a tank, the apparatus comprising, in combination:

a casing disposed at the bottom of the tank and having opposed surfaces;

first and second diaphragms carried by the opposed surfaces of the casing, the casing and the first and second diaphragms forming an atmospheric chamber isolated from the fluid, the external surfaces of the chamber being exposed to the fluid pressure at the bottom of the tank, the fluid exerting a force equal to $A_1*P_f$ on the first diaphragm and an opposing force $A_2*P_f$ on the second diaphragm, where $A_1$ is the area of the first diaphragm, $A_2$ is the area of the second diaphragm and $P_f$ is the fluid pressure per unit area at the bottom of the tank and which is proportional to the level of the fluid in the tank;

a valve including a moveable valve member and a valve seat having an area $A_3$;

means for transmitting the net force $P_f(A_1-A_2)$ exerted by the fluid on the first and second diaphragms to the valve member in a sense tending to seat the valve member against the valve seat;

an output pressure line coupled between the pressure gage and the valve seat, the output pressure line being vented to the tank when the valve member is unseated from the valve seat;

a fluid pump for pumping fluid under pressure from the tank;

a fluid flow restrictor;

means for coupling the liquid under pressure to the output pressure line through the fluid flow restrictor to pressurize the output pressure line, the fluid pressure in the output pressure line generating a force equal to $P_g*A_3$ on the valve member tending to unseat the valve member from the valve seat, where $P_g$ is equal to the pressure per unit area of the fluid in the output pressure line, the valve member being moved by the forces acting thereon to modulate the pressure $P_g$ in the output pressure line to a value substantially equal to $P_f(A_1-A_2)/A_3$; and a pressure gage responsive to the fluid pressure in the output pressure line for providing a measure of the fluid level in the tank.

2. The apparatus of claim 1 wherein the area $A_1$ of the first diaphragm is greater than the area $A_2$ of the second diaphragm and the area $A_3$ is less than the difference $A_1-A_2$ so that the fluid pressure in the output pressure line is greater than the fluid pressure at the bottom of the tank.

* * * * *